(12) United States Patent
Wei

(10) Patent No.: US 9,314,958 B2
(45) Date of Patent: Apr. 19, 2016

(54) BUFFER ASSEMBLY OF VACUUM MOLDING AND CUTTING MACHINE

(71) Applicant: CHENG MEI MACHINE CO., LTD., Daxi Township, Taoyuan County (TW)

(72) Inventor: Chiou-Sheng Wei, Daxi Township, Taoyuan County (TW)

(73) Assignee: CHENG MEI MACHINE CO., LTD., Taoyuan County (TW)

( * ) Notice: Subject to any disclaimer, the term of this patent is extended or adjusted under 35 U.S.C. 154(b) by 463 days.

(21) Appl. No.: 14/040,747

(22) Filed: Sep. 30, 2013

(65) Prior Publication Data

US 2014/0144738 A1 May 29, 2014

(30) Foreign Application Priority Data

Nov. 23, 2012 (TW) .............................. 101222758 U

(51) Int. Cl.
| | |
|---|---|
| *B29C 51/20* | (2006.01) |
| *B29C 51/26* | (2006.01) |
| *B26F 1/40* | (2006.01) |
| *B30B 15/00* | (2006.01) |
| *B30B 15/06* | (2006.01) |
| *F16F 15/023* | (2006.01) |
| *B26D 5/12* | (2006.01) |
| *B29C 51/38* | (2006.01) |

(52) U.S. Cl.
CPC . *B29C 51/26* (2013.01); *B26F 1/40* (2013.01); *B30B 15/007* (2013.01); *B30B 15/062* (2013.01); *B26D 5/12* (2013.01); *B29C 51/38* (2013.01); *F16F 15/023* (2013.01)

(58) Field of Classification Search
CPC ...... B29C 51/26; B29C 51/38; B30B 15/007; B30B 15/062
USPC ............................................ 425/450.1–451.6
See application file for complete search history.

(56) References Cited

U.S. PATENT DOCUMENTS

| | | | | |
|---|---|---|---|---|
| 2,136,308 | A * | 11/1938 | Miller ..................... | B31B 43/00 493/152 |
| 6,402,497 | B1 * | 6/2002 | Banjyo ................. | B29C 45/661 425/451.6 |
| 6,918,753 | B2 * | 7/2005 | Nemeskeri .......... | B29C 37/0007 425/451 |
| 7,108,811 | B2 * | 9/2006 | Summerer ............ | B29C 45/561 425/451 |

* cited by examiner

*Primary Examiner* — Joseph S Del Sole
*Assistant Examiner* — Thukhanh T Nguyen
(74) *Attorney, Agent, or Firm* — Leong C. Lei

(57) ABSTRACT

Disclosed is a buffer assembly of a vacuum molding and cutting machine, and the buffer assembly includes a lower mold base, at least four hydraulic elements and a movable plate. The lower mold base has at least four installing holes for installing the hydraulic elements respectively, and each hydraulic element includes a piston plunger for propping the movable plate to a predetermined distance. When the cutting thickness is 0.1 mm-0.5 mm of a sheet, the impact force can be absorbed effectively to maintain the parallelism for the cutting, so as to improve the cutting quality and extend the service life of a die cutting tool.

8 Claims, 5 Drawing Sheets

BUFFER ASSEMBLY OF VACUUM MOLDING AND CUTTING MACHINE

CROSS-REFERENCE TO RELATED APPLICATIONS

This non-provisional application claims priority under 35 U.S.C. §119(a) on Patent Application No(s). 101222758 filed in Taiwan, R.O.C. on Nov. 23, 2012, the entire contents of which are hereby incorporated by reference.

BACKGROUND OF THE INVENTION

1. Field of the Invention

The present invention relates to the technical field of vacuum molding and cutting machines, and more particularly to a buffer assembly that buffers the impact and pressing forces produced by a cutting operation of a die cutting tool by a hydraulic element to ensure the parallelism of the cutting in order to cut a sheet uniformly and extend the service life of the die cutting tool.

2. Description of the Related Art

In recent years, pressure vacuum forming machines generally use a pair of servo cranks to drive an upper mold base and a lower mold base to improve the quality and efficiency of the forming process, and each servo crank is controlled and operated by a servomotor and connected to the corresponding upper mold base and lower mold base, and the bottom of the lower mold base has a pair of large hydraulic cylinders corresponding to the servo cranks respectively, and a small hydraulic cylinder disposed between the pair of large hydraulic cylinders, wherein the pair of large hydraulic cylinders are provided for pushing the lower mold base upward and the upper mold base downward respectively for a mold clamping of the upper and lower mold bases. After the mold clamping is completed, a sheet is primarily formed into a plurality of molded objects such as cups or other containers. The small hydraulic cylinder is to provide the travelling stability during the ascending process of the lower mold base. The finished goods still require a cutting process, so that the molded objects are separated from the sheet, and the same aforementioned driving method is used to drive a die cutting tool disposed at the upper mold base and a carrier plate of the lower mold base to be engaged to perform the cutting operation.

However, it is difficult to control the elevation stroke of the upper mold base and the lower mold base precisely (with an error of 0.01 mm) when this cutting technique is used for cutting a large sheet, the impact between the die cutting tool and the carrier plate may give rise to the issues of damaging the die cutting tool or failing to cut the desired object thoroughly. If the strokes of the carrier plate and the die cutting tool are adjusted, the force exerted onto each corner cannot be balanced and the height cannot be adjusted automatically during the mold clamping process, so that the die cutting tool and the carrier plate cannot be engaged tightly with each other, and the sheet and the molded objects cannot be cut thoroughly. In addition, the impact force produced in the mold clamping process may damage the die cutting tool or the carrier plate, so that maintenance, repair or replacement are required frequently, not only wasting time and effort, but also brining up a major problem of wasting materials. Obviously, the conventional vacuum molding and cutting machine requires improvements.

SUMMARY OF THE INVENTION

Therefore, it is a primary objective of the present invention to overcome the problems of the prior art by providing a buffer assembly of a vacuum molding and cutting machine capable of regulating the parallelism between a die cutting tool and a sheet automatically in a cutting process to improve the cutting effect, so as to improve the cutting quality significantly. Since the present invention can buffer the impact force of the die cutting tool effectively, therefore the service life of the die cutting tool can be extended.

To achieve the aforementioned objectives, the present invention provides a buffer assembly of a vacuum molding and cutting machine for buffering the impact force produced by punching a die cutting tool onto a sheet with a cutting thickness of 0.1 mm-0.5 mm, such that a blade of the die cutting tool cuts the sheet uniformly, comprising: a lower mold base, disposed under the die cutting tool, and having at least four installing holes formed around the periphery of the lower mold base, and the installing holes being arranged in pairs; at least four hydraulic elements, disposed in the installing holes respectively, and having a piston plunger installed at the top of each hydraulic element; and a movable plate, disposed above the lower mold base, and having a plurality of slots corresponding to the installing holes respectively, such that the piston plunger of each hydraulic element can be placed in each corresponding slot to prop the movable plate, and a predetermined distance is defined between the movable plate and the lower mold base. Wherein, the predetermined distance falls within a range of 0.5 mm-3 mm. During use, the movable plate is impacted by the die cutting tool, and the piston plungers are provided for absorbing the impact force, such that the forces exerted at corners of the movable plate are balanced to enhance the parallelism effectively during the cutting process, so that when a large sheet is cut, a blade of the die cutting tool can abut the surface of the movable plate uniformly to achieve the effect of cutting the sheet uniformly, not only improving the cutting quality, but also extending the service life of the die cutting tool.

In a preferred embodiment, the lower mold base and the movable plate are rectangular block structures, and the four installing holes are disposed at position proximate to four corners of the lower mold base respectively, and the four slots are disposed at position proximate to four corners of the movable plate respectively for scattering the impact forces effective to maintain the stability of the movable plate.

Wherein, each hydraulic element includes the piston plunger, an upper flange cover and a lower flange cover, and the upper flange cover and the lower flange cover engaged with each other from the upper and lower openings of each installing hole for clamping the piston plunger therein. In addition, each slot has a cascade cross-section, and each installing hole has a cascade cross-section. The upper flange cover has an end with an external diameter corresponding to the internal diameter of the slot and contained into the slot, and the other end of the upper flange cover has an external diameter corresponding to the internal diameter of the installing hole and contained in the installing hole, so that the piston plunger can be fixed into the installing hole.

In a preferred embodiment, each hydraulic element is coupled to a same hydraulic pressure source, and a pressure regulator is installed between each hydraulic element and the hydraulic pressure source for regulating the pressure value of each hydraulic element. Alternatively, each hydraulic element is coupled to each corresponding single hydraulic pressure source, so that the pressure value of each hydraulic element can be regulated individually. The aforementioned implementation modes of the present invention can be used for regulating different impact forces during the cutting process.

DETAILED DESCRIPTION OF THE PREFERRED EMBODIMENTS

Figure 1:
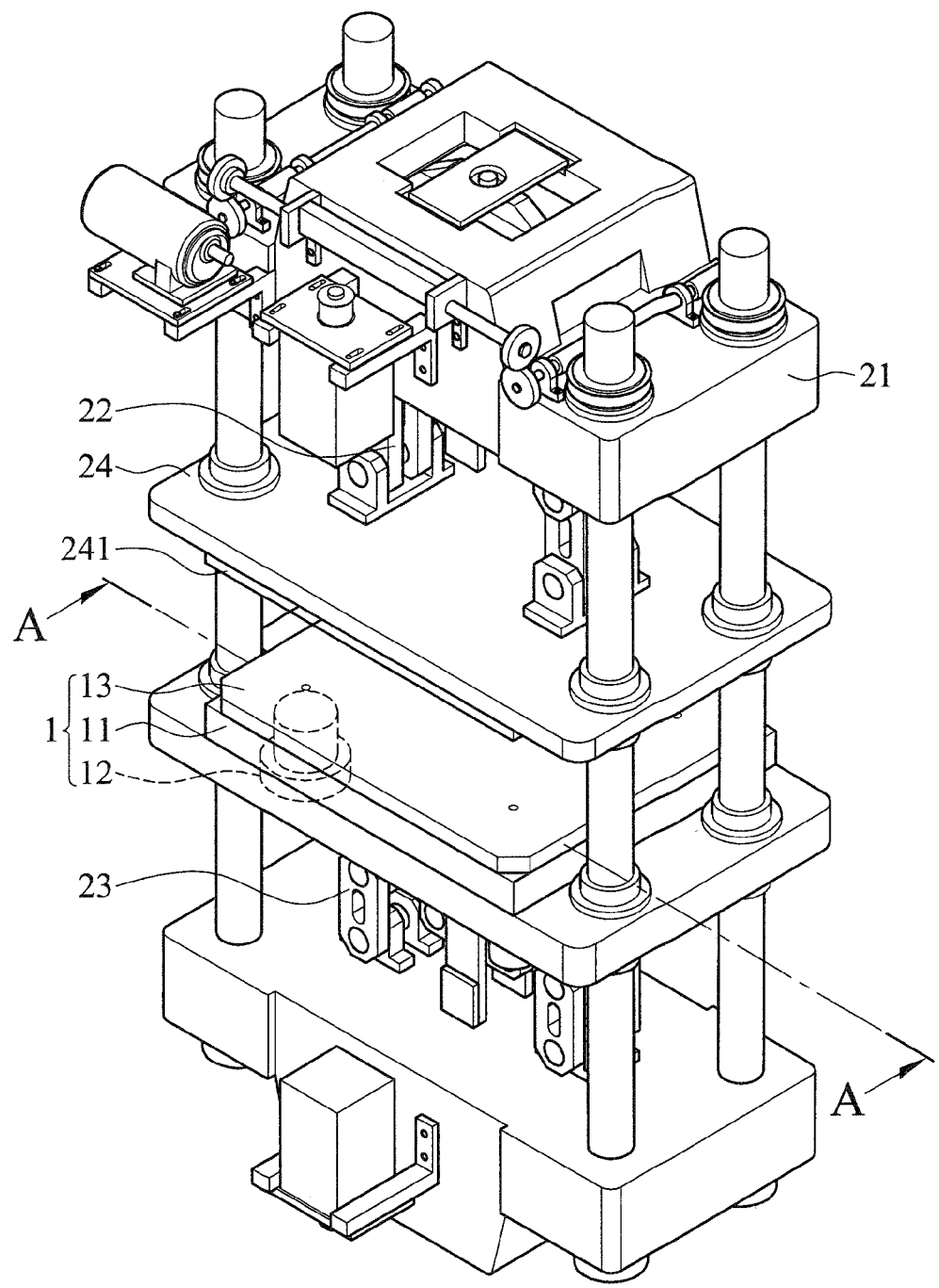
FIG. 1 is a schematic view of a preferred embodiment of the present invention.
Figure 2:
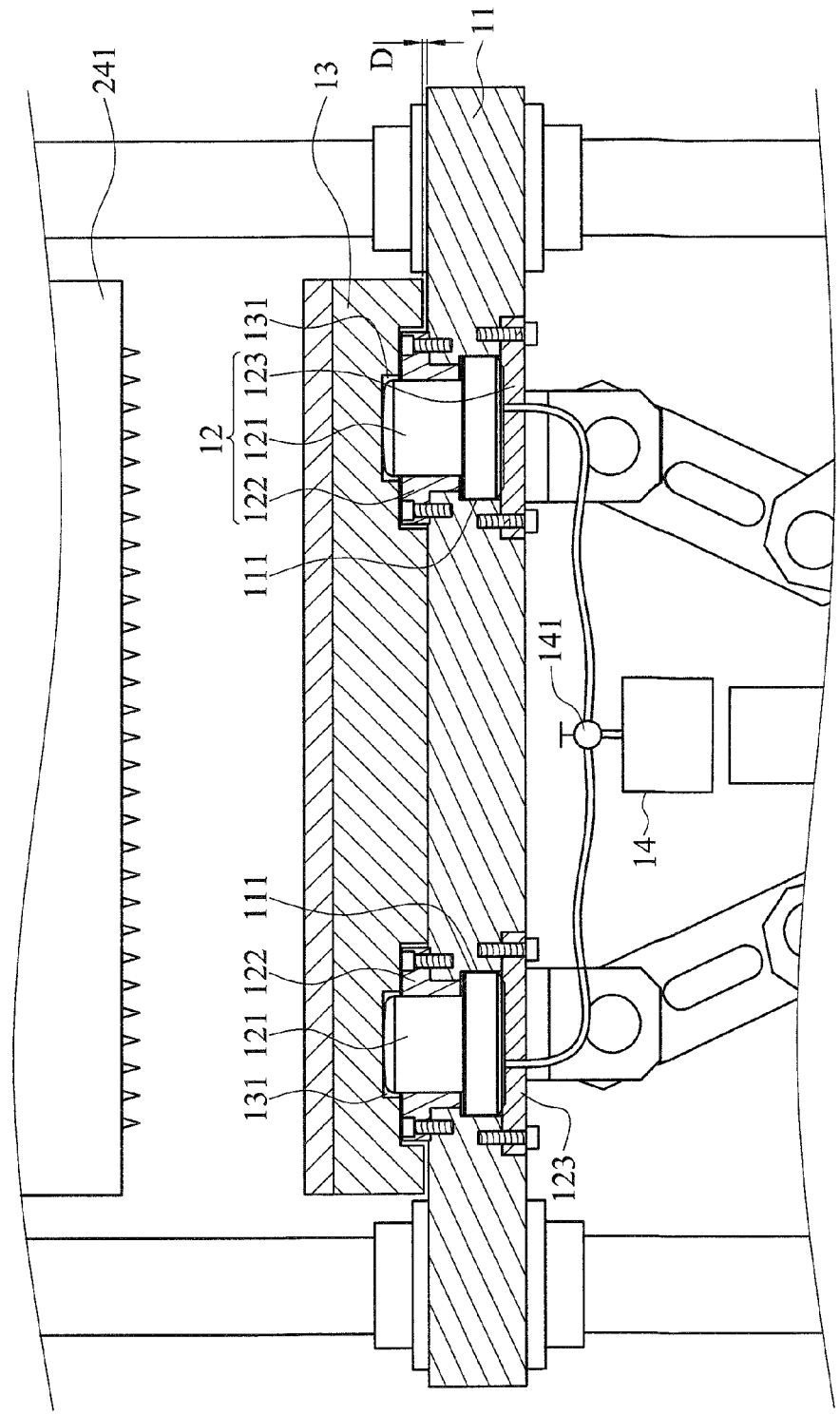
FIG. 2 is a partial blow-up view of a preferred embodiment of the present invention.

The aforementioned and other objectives, technical characteristics and advantages of the present invention will become apparent with the detailed description of preferred embodiments and the illustration of related drawings as follows.

With reference to FIGS. 1, 2, and 3 to 5 for a schematic view, a partial blow-up view and schematic views of different operating statuses of a buffer assembly in accordance with a preferred embodiment of the present invention respectively, the buffer assembly 1 is applied to a vacuum molding and cutting machine 2, wherein the vacuum molding and cutting machine 2 is provided with an upper servo crane set 22 and a lower servo crane set 23 in a chassis 21. And the upper servo crane set 22 is coupled to a side of an upper mold base 24, and the upper mold base 24 includes a die cutting tool 241 installed thereon. The buffer assembly 1 comprises a lower mold base 11, four hydraulic elements 12 and a movable plate 13, and the lower servo crane set 23 is coupled to a side of the lower mold base 11.

Wherein, the lower mold base 11 is a rectangular block structure disposed at the bottom of the die cutting tool 241, and four installing holes 111 are formed around the periphery of the lower mold base 11 as shown in the figure, and the four installing holes 111 are disposed at positions proximate to four corners of the lower mold base 11 respectively, wherein the installing holes 111 are arranged in pairs.

Each hydraulic element 12 is installed in each installing hole 111 and includes a piston plunger 121, an upper flange cover 122 and a lower flange cover 123; and each piston plunger 121 is coupled to a hydraulic pressure source 14, and an appropriate hydraulic pressure is outputted from the hydraulic pressure source 14 to drive each piston plunger 121 to maintain the appropriate pressure value. When the die cutting tool 241 presses the movable plate 13 down, the impact force is absorbed by the piston plungers 121 and the height of each corner of the movable plate 13 is maintained to be in dynamic balance. It is noteworthy that a pressure regulator 141 is installed between each piston plunger 121 and the hydraulic pressure source 14 to facilitate operators to regulate the pressure value of the piston plungers 121, or each piston plunger 121 is coupled to the hydraulic pressure source 14 for regulating the pressure value of each plunger 121 to ensure the dynamic balance of each piston plunger 121 when a force is exerted onto the piston plunger 121.

The movable plate 13 is a rectangular block structure and installed with an interval from the top of the lower mold base 11, and the movable plate 13 has a plurality of slots 131 corresponding to the installing holes 111 respectively, and the four slots 131 are disposed at position proximate to four corners of the movable plate 13 respectively, so that the piston plunger 121 of each hydraulic element 12 is installed in each corresponding slot 131 to prop the movable plate 13. And a predetermined distance D is formed between the movable plate 13 and the lower mold base 11, and the predetermined distance D falls within a range of 0.5 mm-3 mm. In addition, each slot 131 has a cascade cross-section, and each upper flange cover 122 and each lower flange cover 123 are covered onto the upper and lower openings of each installing hole 111 respectively, and the piston plungers 121 are engaged and clamped into each installing hole 111. In addition, an end of the upper flange cover 122 has an external diameter corresponding to the internal diameter of the slot 131 and contained into the slot 131. And the other end of the upper flange cover 123 has an external diameter corresponding to the internal diameter of the installing hole 111 and contained into the installing hole 111, so that the piston plunger 121 can be fixed into the installing hole 111.

Figure 3:
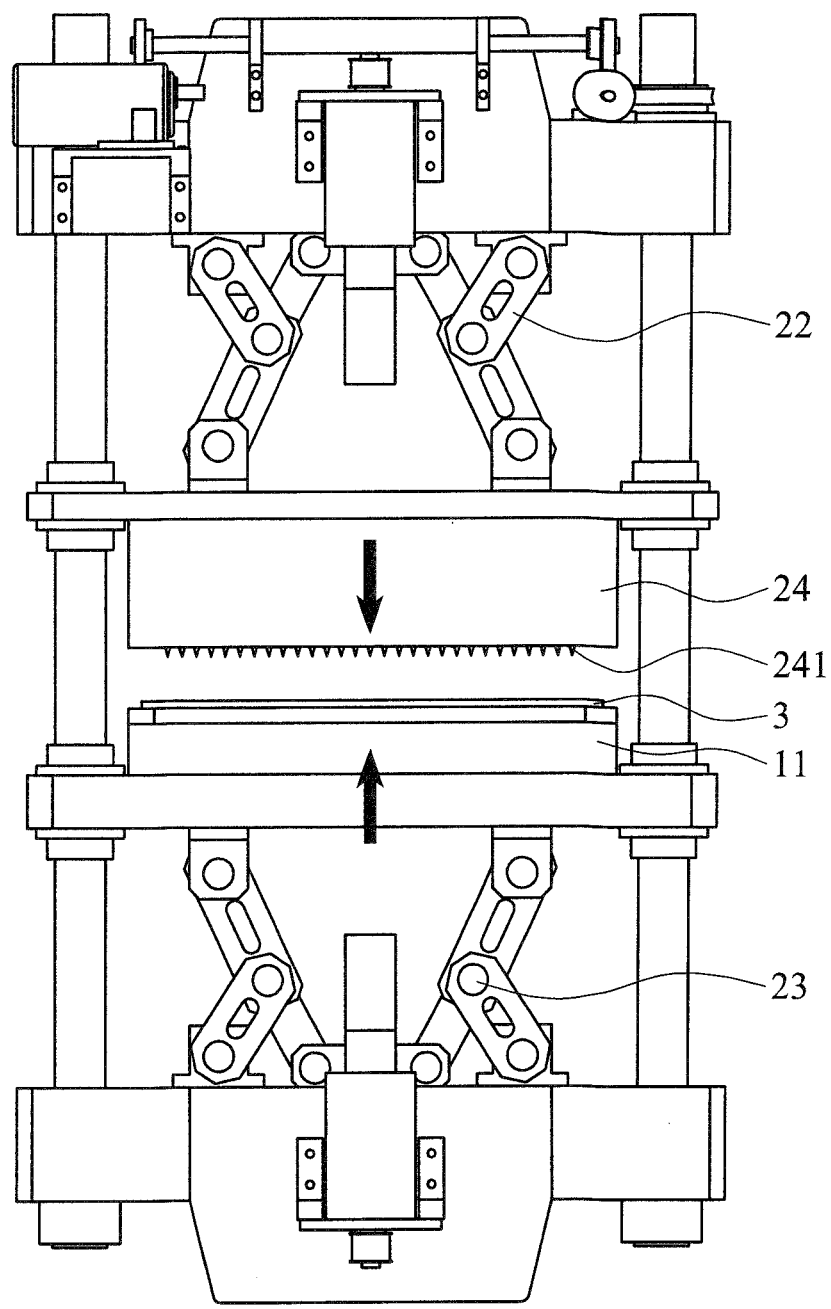
FIG. 3 is a first schematic view of a preferred embodiment of the present invention.
Figure 4:
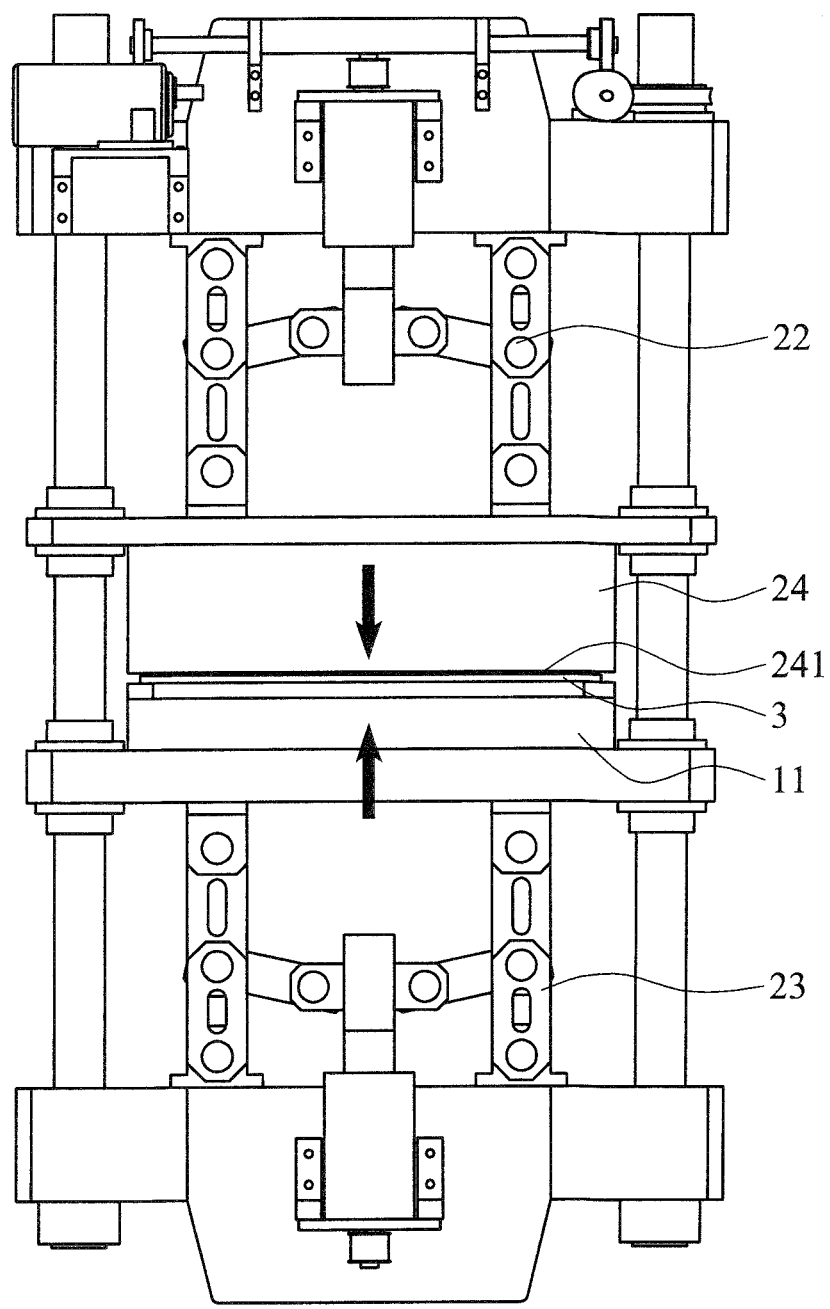
FIG. 4 is a second schematic view of a preferred embodiment of the present invention.
Figure 5:
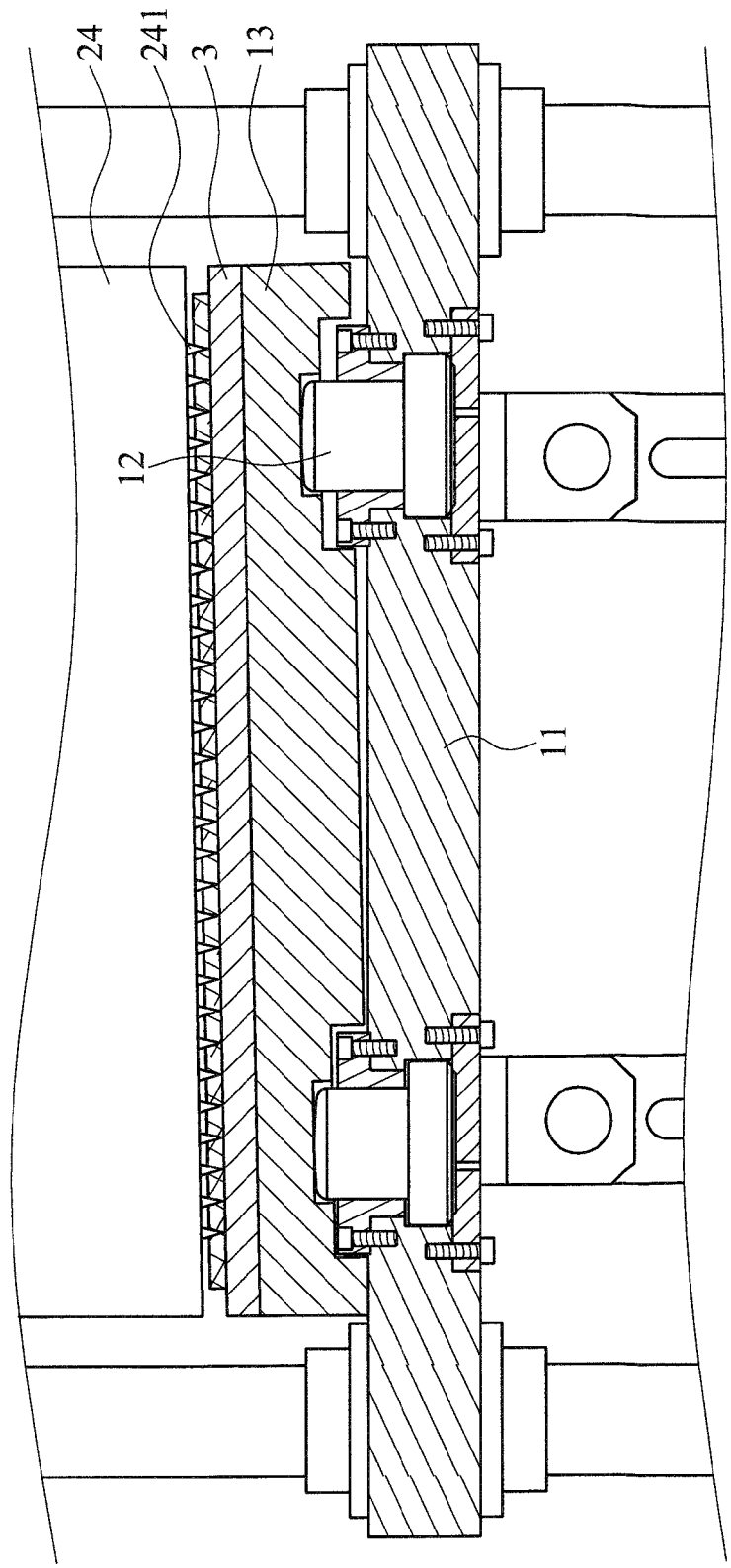
FIG. 5 is a third schematic view of a preferred embodiment of the present invention.

In FIGS. 3, 4 and 5, when the vacuum molding and cutting machine 2 is operated, the upper mold base 24 is driven by the upper servo crane set 22 to descend, and the lower mold base 11 is driven by the lower servo crane set 23 to ascend, so that the die cutting tool 241 can punch downwardly. If the cutting thickness of a sheet 3 falls within a range of 0.1 mm-0.5 mm (particularly for a cutting job of a large sheet 3), the impact force of the die cutting tool 241 is slightly greater than the buffer pressure value of each hydraulic element 12, so that the movable plate 13 is pressed downwardly by the force to descend to a distance within the range of the predetermined distance D, and each corner of the movable plate 13 is tilted by the downward pressing force to achieve the dynamic balance effect, so as to improve the parallelism between the die cutting tool 241 and the sheet 3 during the cutting process, and align the die cutting tool 241 with the lower mold base 11 uniformly to cut the sheet 3. Assumed that a blade of the die cutting tool 241 is tilted, an end with a smaller height is disposed next to a corner of the movable plate 13, such that the entire surface is tilted, so that the blade of the die cutting tool 241 can be aligned uniformly with the movable plate 13 to cut the sheet 3. The present invention not only buffers the impact force during the cutting process, but also prevents the die cutting tool 241 from being damaged by the impact force and avoids the incomplete cutting issue. In addition, after the die cutting tool 241 moves upward, the hydraulic elements 12 can resume their original positions by a preset pressure value.

What is claimed is:

1. A buffer assembly of a vacuum molding and cutting machine, for buffering the impact force produced by punching a die cutting tool onto a sheet with a cutting thickness of 0.1 mm-0.5 mm, such that a blade of the die cutting tool cuts the sheet uniformly, comprising:
   - a lower mold base, disposed under the die cutting tool, and having at least four installing holes formed around the periphery of the lower mold base, and the installing holes being arranged in pairs;
   - at least four hydraulic elements, disposed in the installing holes respectively, and having a piston plunger installed at the top of each hydraulic element; and
   - a movable plate, disposed above the lower mold base, and having a plurality of slots corresponding to the installing holes respectively, such that the piston plunger of each hydraulic element can be placed in each corresponding slot to prop the movable plate, and a predetermined distance is defined between the movable plate and the lower mold base.

2. The buffer assembly of a vacuum molding and cutting machine according to claim 1, wherein the lower mold base and the movable plate are rectangular block structures, and the four installing holes are disposed at positions proximate to four corners of the lower mold base respectively, and the four slots are disposed at positions proximate to four corners of the movable plate respectively.

3. The buffer assembly of a vacuum molding and cutting machine according to claim 1, wherein the predetermined distance falls within a range of 0.5 mm-3 mm.

4. The buffer assembly of a vacuum molding and cutting machine according to claim 1, wherein each hydraulic element includes the piston plunger, an upper flange cover and a lower flange cover, and the piston plunger is provided in each installing hole via a upper and a lower opening of the installing hole, and positioned between the upper flange cover and the lower flange cover.

5. The buffer assembly of a vacuum molding and cutting machine according to claim 4, wherein each slot has a cascade cross-section, and each installing hole has a cascade cross-section.

6. The buffer assembly of a vacuum molding and cutting machine according to claim 5, wherein the upper flange cover has an end with an external diameter corresponding to the internal diameter of the slot and contained into the slot, and the other end of the upper flange cover has an external diameter corresponding to the internal diameter of the installing hole and contained in the installing hole.

7. The buffer assembly of a vacuum molding and cutting machine according to claim 1, wherein each hydraulic element is coupled to a same hydraulic pressure source, and a pressure regulator is installed between each hydraulic element and the hydraulic pressure source.

8. The buffer assembly of a vacuum molding and cutting machine according to claim 1, wherein each hydraulic element is coupled to each corresponding single hydraulic pressure source.

* * * * *